US010363656B1

(12) United States Patent
Kitts et al.

(10) Patent No.: US 10,363,656 B1
(45) Date of Patent: Jul. 30, 2019

(54) MULTI-ROBOT GRADIENT BASED ADAPTIVE NAVIGATION SYSTEM

(71) Applicant: Santa Clara University, Santa Clara, CA (US)

(72) Inventors: Christopher A. Kitts, Burlingame, CA (US); Thomas Adamek, Sunnyvale, CA (US); Ignacio Mas, Buenos Aires (AR)

(73) Assignee: Santa Clara University, Santa Clara, CA (US)

( * ) Notice: Subject to any disclaimer, the term of this patent is extended or adjusted under 35 U.S.C. 154(b) by 0 days.

(21) Appl. No.: 14/749,944

(22) Filed: Jun. 25, 2015

Related U.S. Application Data
(60) Provisional application No. 62/016,845, filed on Jun. 25, 2014.

(51) Int. Cl.
*G08G 3/00* (2006.01)
*B25J 9/00* (2006.01)
*G05D 1/00* (2006.01)

(52) U.S. Cl.
CPC .......... *B25J 9/0084* (2013.01); *G05D 1/0027* (2013.01); *Y10S 901/01* (2013.01)

(58) Field of Classification Search
USPC ................................................ 700/245–264
See application file for complete search history.

(56) References Cited

U.S. PATENT DOCUMENTS

| | | | | |
|---|---|---|---|---|
| 3,764,964 A * | 10/1973 | Seeley, Jr. | ............... | G01S 3/808 342/374 |
| 6,266,577 B1 * | 7/2001 | Popp | ........................ | B25J 9/163 700/245 |
| 6,374,155 B1 * | 4/2002 | Wallach | ............... | G05D 1/0274 700/245 |
| 6,636,781 B1 * | 10/2003 | Shen | ........................ | B08B 9/045 318/568.11 |
| 7,966,093 B2 * | 6/2011 | Zhuk | .................... | G05D 1/0088 700/245 |
| 8,577,538 B2 * | 11/2013 | Lenser | .................. | G05D 1/0274 701/2 |
| 8,632,376 B2 * | 1/2014 | Dooley | ................... | A63F 9/143 273/246 |
| 8,809,755 B1 * | 8/2014 | Patel | ....................... | F42B 19/06 244/3.26 |
| 8,838,292 B2 * | 9/2014 | Palm | ..................... | G05D 1/0289 701/2 |
| 8,996,224 B1 * | 3/2015 | Herbach | .............. | G05D 1/0011 180/116 |
| 9,043,069 B1 * | 5/2015 | Ferguson | .............. | B60W 30/00 701/23 |
| 9,261,578 B2 * | 2/2016 | Im | ......................... | G01S 5/0252 |
| 9,315,248 B2 * | 4/2016 | Williams | ............... | B63G 8/001 |
| 2004/0030449 A1 * | 2/2004 | Solomon | ............... | B64C 39/024 700/245 |
| 2004/0162638 A1 * | 8/2004 | Solomon | ................. | F41H 13/00 700/247 |
| 2006/0015215 A1 * | 1/2006 | Howard | ............... | G05D 1/0094 700/245 |
| 2007/0156286 A1 * | 7/2007 | Yamauchi | ............ | G05D 1/0038 700/245 |

(Continued)

*Primary Examiner* — Jonathan L Sample
(74) *Attorney, Agent, or Firm* — Lumen Patent Firm

(57) ABSTRACT

Systems and methods for multi-robot gradient-based adaptive navigation are provided.

1 Claim, 1 Drawing Sheet

(56) References Cited

U.S. PATENT DOCUMENTS

| | | | |
|---|---|---|---|
| 2007/0168117 A1* | 7/2007 | Howard | F41G 3/04 |
| | | | 701/425 |
| 2007/0233337 A1* | 10/2007 | Plishner | G05D 1/0295 |
| | | | 701/23 |
| 2008/0027591 A1* | 1/2008 | Lenser | G05D 1/0251 |
| | | | 701/2 |
| 2009/0000860 A1* | 1/2009 | Plunkett | B63G 8/38 |
| | | | 181/200 |
| 2009/0031940 A1* | 2/2009 | Stone | B63C 11/42 |
| | | | 114/330 |
| 2012/0113756 A1* | 5/2012 | Carcaterra | G01V 1/3843 |
| | | | 367/144 |
| 2012/0281503 A1* | 11/2012 | Rikoski | G01C 21/005 |
| | | | 367/88 |
| 2013/0083623 A1* | 4/2013 | Brizard | G01V 1/3852 |
| | | | 367/15 |
| 2013/0083624 A1* | 4/2013 | Brizard | B63C 11/42 |
| | | | 367/15 |
| 2014/0107865 A1* | 4/2014 | Griffith, Sr. | G05D 1/00 |
| | | | 701/2 |
| 2014/0177387 A1* | 6/2014 | Brizard | G01V 1/3808 |
| | | | 367/15 |
| 2014/0301161 A1* | 10/2014 | Brizard | B63G 8/001 |
| | | | 367/15 |
| 2014/0365258 A1* | 12/2014 | Vestal | G06Q 10/063114 |
| | | | 705/7.15 |
| 2015/0202770 A1* | 7/2015 | Patron | G05D 1/024 |
| | | | 700/245 |
| 2015/0276959 A1* | 10/2015 | Grimsdale | G01V 1/3835 |
| | | | 701/21 |
| 2015/0331421 A1* | 11/2015 | Brunet | G05D 1/0692 |
| | | | 701/23 |
| 2016/0353238 A1* | 12/2016 | Gherardi | H04W 4/021 |

* cited by examiner

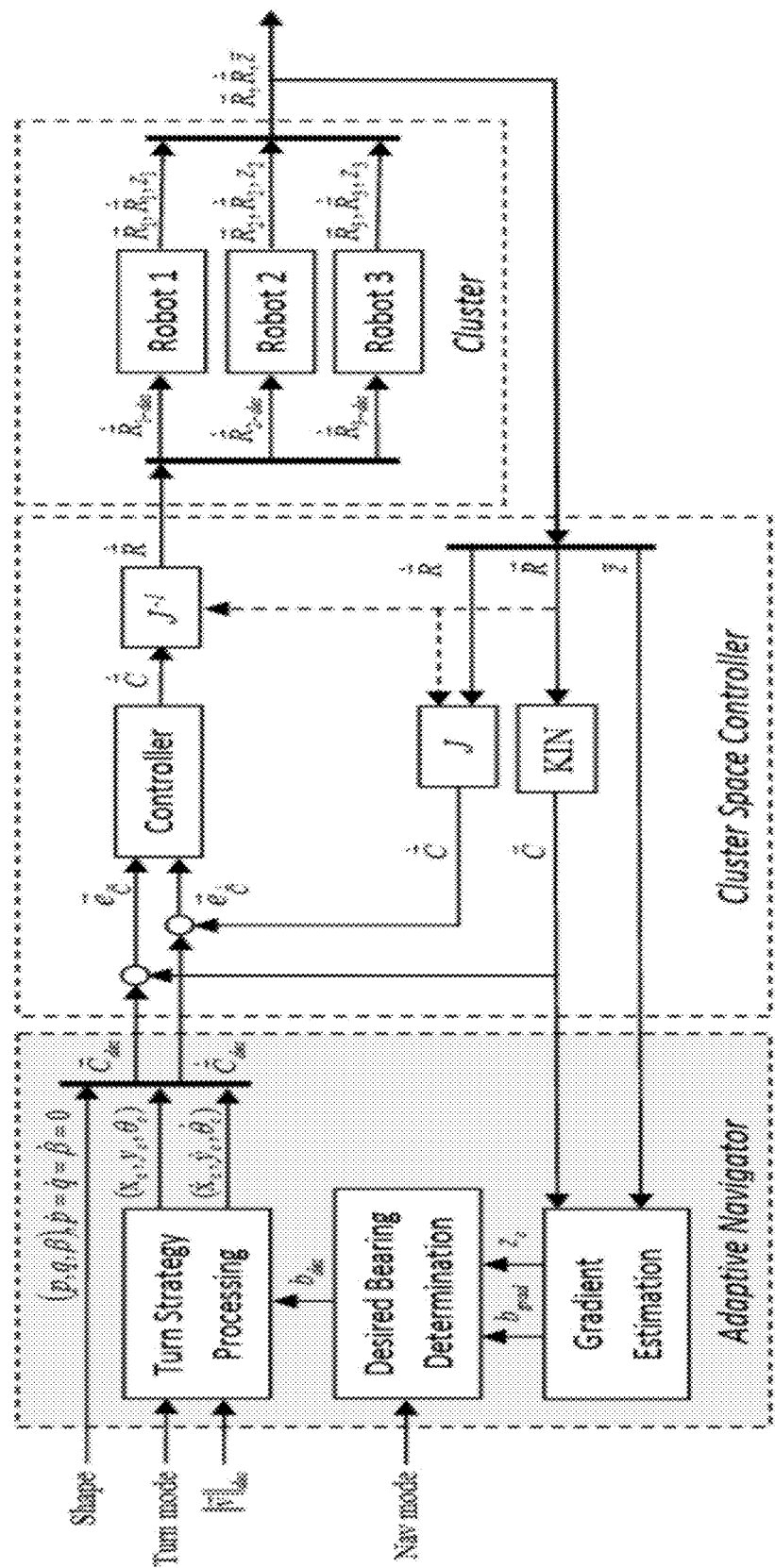

MULTI-ROBOT GRADIENT BASED ADAPTIVE NAVIGATION SYSTEM

CROSS-REFERENCE TO RELATED APPLICATIONS

This application claims priority from U.S. Provisional Patent Application 62/016,845 filed Jun. 25, 2014, which is incorporated herein by reference.

STATEMENT OF GOVERNMENT SPONSORED SUPPORT

This invention was made with Government support under grant (or contract) no. CNS-0619940 awarded by the National Science Foundation. The Government has certain rights in the invention.

FIELD OF THE INVENTION

This invention relates to adaptive navigation systems for mobile robots.

BACKGROUND OF THE INVENTION

Multi-robot systems have the potential to dramatically impact robotic applications through improved performance and the enabling of completely new capabilities. Alone, robots offer strength, speed, precision, repeatability, and the ability to withstand extreme environments. Combined in a multi-robot system, additional advantages are possible, such as redundancy, increased throughput, expanded coverage/availability, and spatially-distributed sensing and actuation. Multi-robot systems can support applications ranging from remote and in situ sensing to the physical manipulation of objects, and the domains for such applications include land, sea, air, and space. The present invention advances the navigation for such multi-robot systems.

SUMMARY OF THE INVENTION

This present invention provides a gradient-based multi-robot technique for adaptively navigating within a parameter field. To implement this technique, simultaneous measurements of the parameter are made at different locations within the field by a spatially-controlled cluster of mobile robots. These measurements are shared to compute a local gradient of the field. Depending on the task to be achieved, the multi-robot cluster is directed with respect to this direction. Moving in or opposite to the gradient direction allows efficient navigation to local maxima/minima in the field, a capability of interest for applications such as detecting pollution sources or the location of resource-starved areas. Moving perpendicular to the gradient direction allows parameter contours to be navigated, a behavior useful for applications such as defining the extent of a field or establishing a safety perimeter at a defined field level. This invention describes the multi-robot control technique which combines a full degree-of-freedom "cluster space" multi-robot controller with a gradient-based adaptive navigation capability. Verification of the embodiments through field experiments using a fleet of three robotic kayaks is also presented.

This technique has a variety of practical uses and applications. These include, but are not limited to, the following:
1. Finding the maximum location of a quantity of interest. Within the parameter field, the maximum could be a source of pollution (the location of a pipe break in an oil spill, the location of nitrogen-rich fertilizer runoff that damages an ecosystem, a dangerous radiation source, etc.) or a valuable resource (an energy source, the source of radio signals from a lost asset, etc.).
2. Locating the minimal point in a field. This could be the location of very low dissolved oxygen in the marine environment, which can lead to fish kills and harmful algae blooms. It could also represent safe locations, such as in a radiation field.
3. Locating and moving along specific contour lines. This capability could support tasks such as tracing out the extent of a field, setting up a patrol along a contour that defines a safety threshold, and so on.

Such capabilities have wide application in areas like environmental monitoring (oil spills, pollution, runoff, health monitoring, etc.), science (underwater hydrothermal vents, geochemical plume tracing, locating topographic/bathyemetric features of interest, etc.), disaster response (locating sources of radiation or contamination, etc.), communications (dynamically maintaining optimal communication links, finding optimal locations for wireless networking router placement, finding optimal communication paths in changing fields, etc.), homeland security/national defense (locating radar sources, going to locations of minimum probability of discovery, traveling paths of minimal susceptibility, etc.).

There are many advantages to the use of this technique. These include, but are not limited to, the following:
1. A conventional approach to navigating to a feature in a parameter field (like the location of maximum concentration) requires a two-step process in which the entire region is first surveyed in order to identify the feature of interest and then navigation to that location ensues. With our "adaptive" technique, surveying the field and navigating to the point of interest are simultaneous; furthermore, the entire region does not need to be mapped. This allows for dramatic savings in time and energy in order to go to the location of interest.
2. The adaptive technique supports navigation to features of interest even in time-varying fields. This is not possible in the conventional two-step map then navigate approach.
3. The multi-robot approach allows for an instantaneous estimate of the gradient direction. Single robot approaches require that the single robot travel through a local path in order to estimate the field gradient; this takes additional time and energy. Furthermore, it will not work with time-varying fields.

BRIEF DESCRIPTION OF THE DRAWINGS

FIG. 1 shows according to an exemplary embodiment of the invention the implemented gradient-based cluster space control architecture.

DETAILED DESCRIPTION

The implemented gradient-based cluster space control architecture is shown in FIG. 1. The robot cluster is shown on the right, with each robot capable of responding to a robot-specific velocity command. The cluster space control layer is shown in the middle. This controller computes an error-drive cluster velocity command, which is converted to robot-specific velocity commands via the inverse Jacobian transform. The research presented in this paper focuses on the inclusion of the adaptive navigation layer, shown in the grey box on the left. This controller estimates the gradient direction, determines the desired bearing for the cluster, and specifies the appropriate cluster state space set-points to achieve the desired navigation task.

Other embodiments, further teachings and/or examples related to the invention are described in U.S. Provisional Patent Application 62/016,845 filed Jun. 25, 2014, which is incorporated herein by reference.

What is claimed is:

1. A system for collective navigation of mobile robots, comprising:
   (a) a cluster of mobile robots equipped with sensors, the robots navigating in a space with a desired navigation task;
   (b) a first controller controlling the kinematics of each of the robots; and
   (c) a second controller adaptively and collectively controlling the navigation of each of the robots in the cluster by receiving information from the sensors of all the mobile robots in the cluster and estimating field characteristics comprising gradient direction and/or differential scalar measurements based on all the received sensor information to then determine a desired bearing for the entire cluster of mobile robots, and specifying appropriate cluster state space set-points comprising cluster size and shape to achieve the desired navigation task for each of the mobile robots in the cluster.

* * * * *